United States Patent
Turmes et al.

(10) Patent No.: US 12,158,785 B2
(45) Date of Patent: Dec. 3, 2024

(54) THERMAL ISLANDING HEATSINK

(71) Applicant: Micron Technology, Inc., Boise, ID (US)

(72) Inventors: Joseph L. Turmes, Nampa, ID (US); Dave Holmstrom, Los Gatos, CA (US)

(73) Assignee: Micron Technology, Inc., Boise, ID (US)

( * ) Notice: Subject to any disclaimer, the term of this patent is extended or adjusted under 35 U.S.C. 154(b) by 231 days.

(21) Appl. No.: 17/869,883

(22) Filed: Jul. 21, 2022

(65) Prior Publication Data

US 2023/0251696 A1 Aug. 10, 2023

Related U.S. Application Data

(60) Provisional application No. 63/308,885, filed on Feb. 10, 2022.

(51) Int. Cl.
*G06F 1/20* (2006.01)
(52) U.S. Cl.
CPC ..................................... *G06F 1/20* (2013.01)
(58) Field of Classification Search
CPC .... G06F 1/20; G06F 2212/214; G06F 3/0679; G06F 1/1658; G06F 1/185; G06F 1/26; G06F 1/3203; G06F 12/0246; G11C 5/04; G11C 16/30; G11C 29/52; H05K 2201/10159; H05K 1/0203; H01L 2924/1434
See application file for complete search history.

(56) References Cited

U.S. PATENT DOCUMENTS

| | | | | |
|---|---|---|---|---|
| 5,208,732 | A * | 5/1993 | Baudouin | H05K 5/0256 257/713 |
| 5,437,041 | A * | 7/1995 | Wakabayashi | G06K 17/00 361/714 |
| 7,929,307 | B2 | 4/2011 | Hsieh | |
| 2006/0037735 | A1 | 2/2006 | Connors | |
| 2006/0268523 | A1 | 11/2006 | Lin | |
| 2007/0008703 | A1 | 1/2007 | Park et al. | |
| 2008/0278916 | A1* | 11/2008 | Hsieh | H01L 23/3672 361/711 |
| 2014/0146461 | A1* | 5/2014 | Choi | G06F 1/203 361/752 |
| 2014/0306335 | A1* | 10/2014 | Mataya | H01L 23/3677 977/734 |
| 2015/0118391 | A1* | 4/2015 | Kilhenny | H05K 1/053 362/373 |
| 2016/0198586 | A1* | 7/2016 | Bouda | G02B 6/4273 361/716 |
| 2017/0023970 | A1* | 1/2017 | Kimura | G06F 3/0679 |
| 2017/0060199 | A1* | 3/2017 | Kim | G06F 1/20 |
| 2017/0315596 | A1* | 11/2017 | Torres | H05K 1/0209 |

(Continued)

*Primary Examiner* — Michael A Matey
(74) *Attorney, Agent, or Firm* — Brooks, Cameron & Huebsch, PLLC

(57) ABSTRACT

A thermal islanding heatsink (a monolithic heat sink that includes a thermal insulating barrier is provided within a memory sub-system. The memory sub-system can be a solid state drive that can include a memory device, such as a volatile memory device and/or a non-volatile memory device, a power regulation area, and/or a controller. The thermal insulating barrier is deployed between the memory device and the power regulation area or between the memory device and the controller.

23 Claims, 4 Drawing Sheets

(56) References Cited

U.S. PATENT DOCUMENTS

| | | | |
|---|---|---|---|
| 2018/0074737 A1* | 3/2018 | Osada | G06F 3/0625 |
| 2018/0107540 A1* | 4/2018 | Lee | G11C 16/3431 |
| 2019/0274232 A1* | 9/2019 | Tuttle | H01L 23/473 |
| 2021/0015006 A1* | 1/2021 | Muto | H05K 1/181 |
| 2021/0193553 A1* | 6/2021 | Munson | H01L 23/3675 |
| 2022/0087072 A1* | 3/2022 | Matsuda | H05K 7/20509 |
| 2022/0142003 A1* | 5/2022 | Kegel | H05K 7/20372 |
| | | | 361/679.53 |
| 2022/0312627 A1* | 9/2022 | Yoshihara | G11C 5/04 |
| 2022/0312633 A1* | 9/2022 | Zhang | H05K 7/20163 |
| 2024/0046965 A1* | 2/2024 | Awaga | G11B 33/142 |
| 2024/0063089 A1* | 2/2024 | Elsherbini | H01L 24/26 |

* cited by examiner

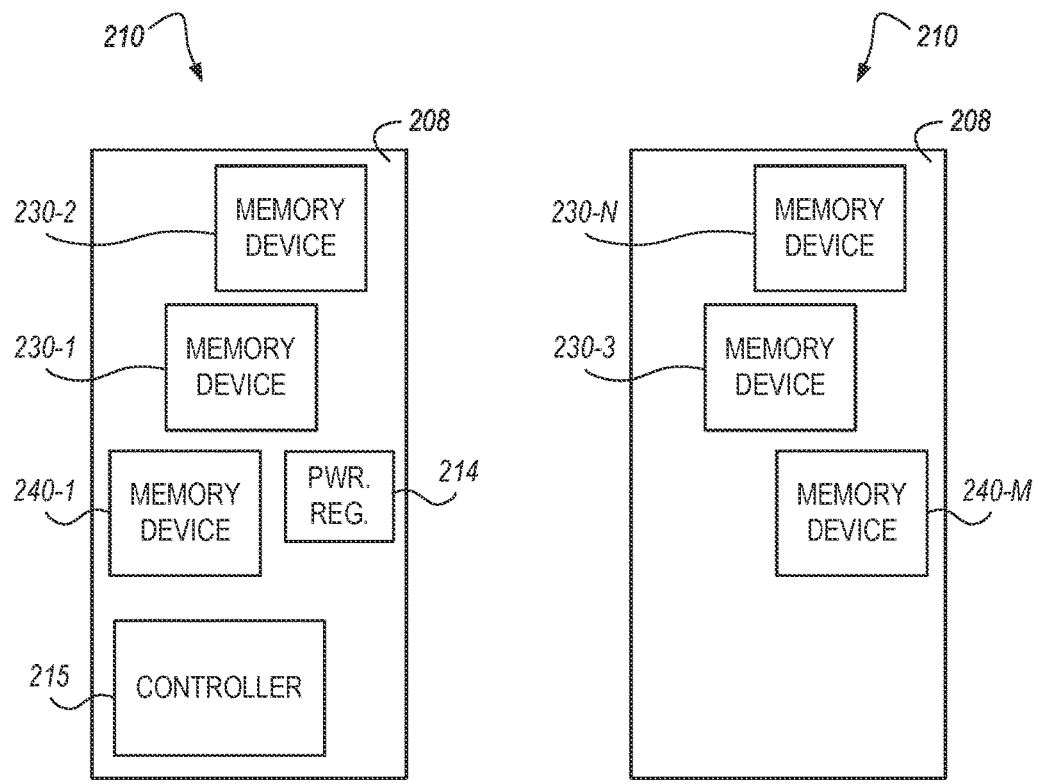
FIG. 2A  FIG. 2B
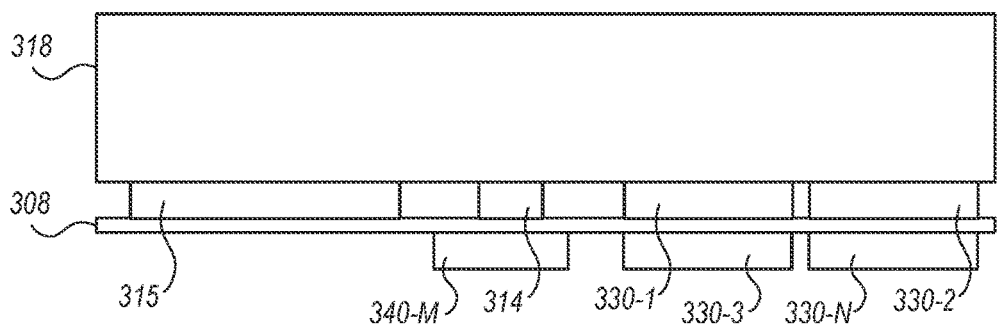
FIG. 3

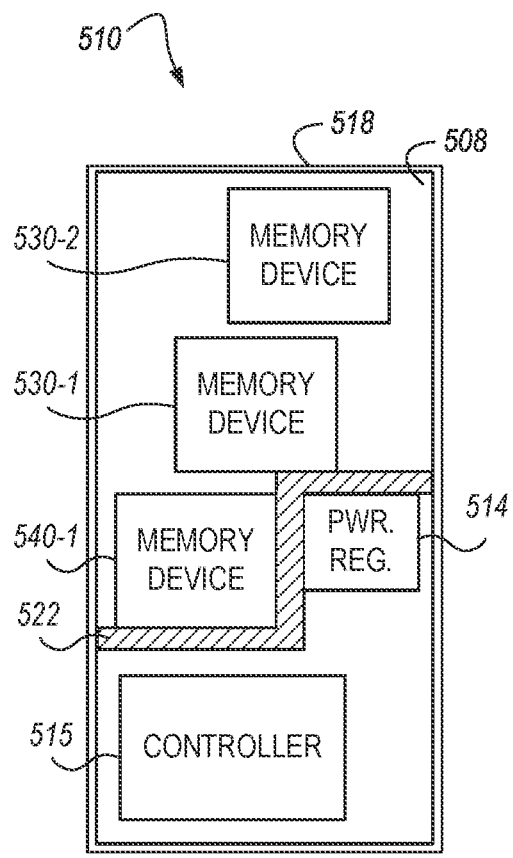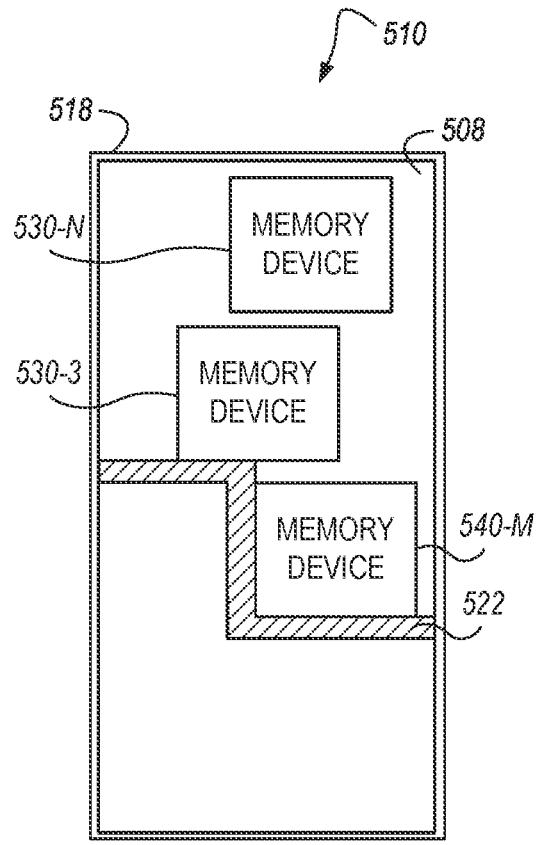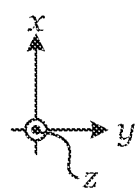
*FIG. 5A*     *FIG. 5B*

THERMAL ISLANDING HEATSINK

PRIORITY INFORMATION

This application claims the benefit of U.S. Provisional Application Ser. No. 63/308,885, filed on Feb. 10, 2022, the contents of which are incorporated herein by reference.

TECHNICAL FIELD

Embodiments of the disclosure relate generally to memory sub-systems, and more specifically, relate to a thermal islanding heatsink, which includes a monolithic heat sink and a thermal barrier.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIG. 2A illustrates an orthogonal top view of an example memory sub-system in accordance with some embodiments of the present disclosure.

FIG. 2B illustrates an orthogonal bottom view of an example memory sub-system in accordance with some embodiments of the present disclosure.

FIG. 3 illustrates an orthogonal side view of an example memory sub-system in accordance with some embodiments of the present disclosure.

FIG. 5A illustrates an orthogonal top view of an example memory sub-system in accordance with some embodiments of the present disclosure.

FIG. 5B illustrates an orthogonal bottom view of an example memory sub-system in accordance with some embodiments of the present disclosure.

DETAILED DESCRIPTION

Figure 1:
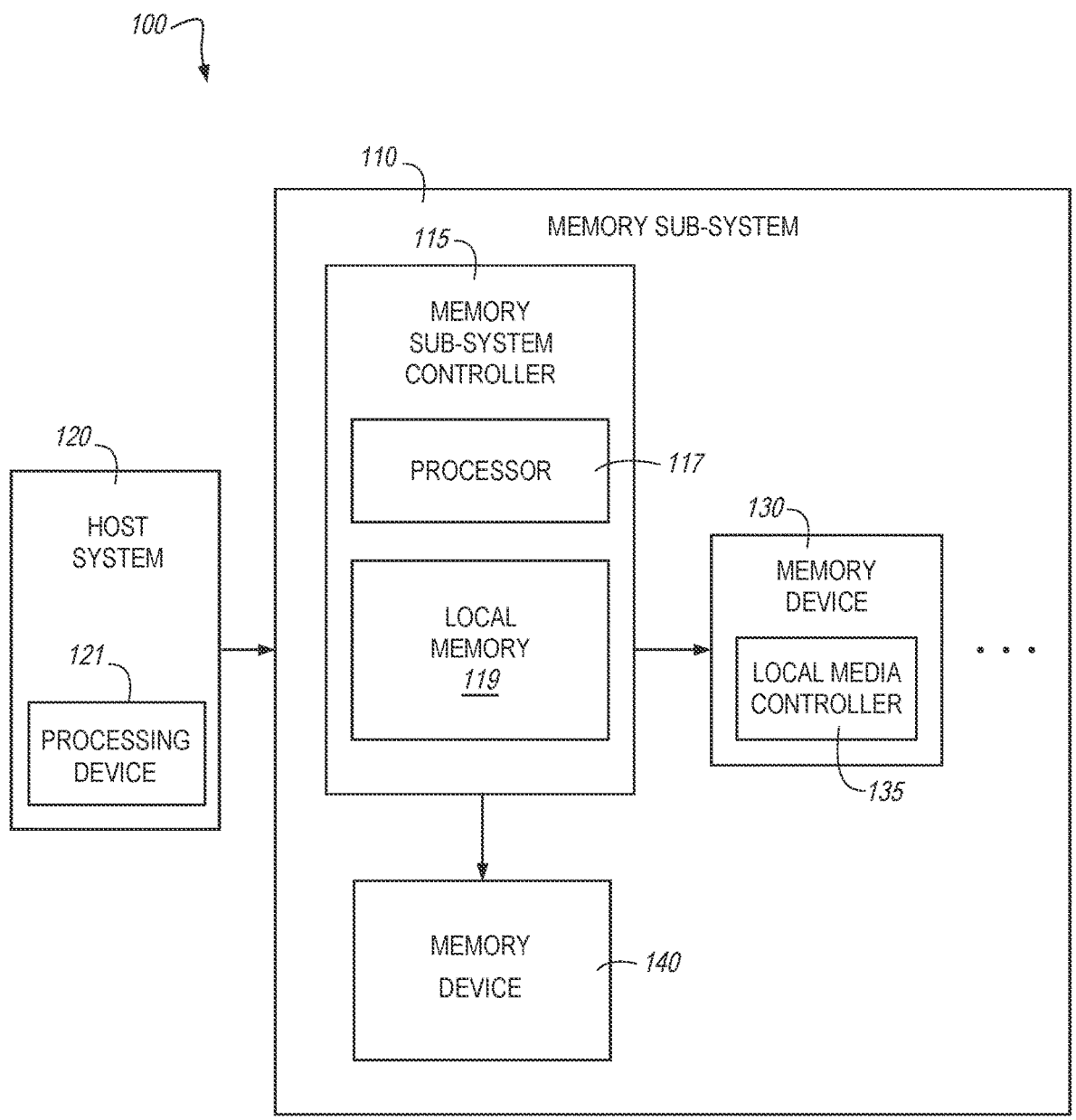
FIG. 1 illustrates an example computing system that includes a memory sub-system in accordance with some embodiments of the present disclosure.

Aspects of the present disclosure are directed to a thermal islanding heatsink (e.g., a heat sink that includes a thermal barrier) in a memory sub-system, in particular to memory sub-systems that contain one or more thermal islanding heatsink(s). A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states, while a TLC can store multiple bits of information and has eight logic states.

Another example of a memory device can be a volatile memory device. A volatile memory device can include a memory array, which can be a dynamic random access memory (DRAM) array, SRAM array, STT RAM array, PCRAM array, TRAM array, and/or RRAM array, for instance. In general, a volatile memory device stores data while the memory device is powered but generally does not store data when the memory device is powered down or is powered off. A memory sub-system, such as a SSD, can include a combination of non-volatile memory devices and volatile memory devices.

During operation, components of a memory sub-system (e.g., a SSD) can experience fluctuations in thermal conditions, such as operating temperatures. For example, because electrical current is utilized to provide power to the components (e.g., memory devices, a power regulation area, controllers, etc.) of a memory sub-system, the memory sub-system and the components thereof can exhibit temperature fluctuations during operation. Such fluctuations can become more pronounced based on the type of workload the memory sub-system and components thereof are subject to. For example, some types of workloads that can be characterized by high volumes of operations can give rise to greater temperature fluctuations within the memory sub-system and the components thereof than workloads that are characterized by low volumes of operations. Further, a memory sub-system can experience temperature fluctuations based on the environment in which the memory sub-system is deployed, an amount of time the memory sub-system is continually operating, and/or a form factor of the memory sub-system, which can dictate the placement and available footprint allowable for the components of the memory device to be deployed.

Although some amount of temperature fluctuation is tolerable within a memory sub-system, the memory sub-system can be adversely affected if such temperature fluctuations exceed certain thresholds. For example, if a memory sub-system is exposed to temperatures that are greater than a threshold safe operating temperature range, the memory sub-system can experience degraded performance and, in some instances, can fail.

Due to the technological evolution of memory sub-system technology, which is, at least in part driven by user (e.g., client, customer, etc.) expectations, there are constantly evolving issues regarding thermal control with respect to memory sub-systems, such as SSDs. For example, because storage media (e.g., memory device) trends are becoming more sensitive to thermal variations given increasing power level demands and/or the implementation of ever-faster storage protocols, thermal control in a memory sub-system continues to become increasingly important in order to mitigate degraded performance and/or failures that can occur when a memory sub-system is exposed to temperatures that approach or exceed a threshold safe operating temperature range. Further, form factors for memory sub-systems and the constituent components thereof are also trending towards a reduction in size due to, for example, the increasing prevalence of compact computing devices (e.g., smartphones, phablets, tablets, laptops, etc.) which can result in more heat being generated in a smaller space.

In conventional approaches, thermal control and/or thermal mitigation in memory sub-systems generally involves spreading components of a memory sub-system, such as a SSD, across a widest area possible to reduce the overall maximum temperature on any part of the memory sub-system. Such approaches can therefore rely on coupling the memory sub-system controller and/or application specific integrated circuits (ASICs) that perform controller functions for the memory sub-system together with the memory devices (e.g., storage media associated with the memory sub-system) and a power regulation area (e.g., power regulation circuitry to provide power to the components of the memory sub-system) on a printed circuit board (PCB). In general, a "power regulation area" refers to an area of a memory sub-system that includes circuitry or other components that are configured to provide and/or manage power (e.g., signals indicative of a voltage, a current, etc.) to operate other components of the memory sub-system. In these approaches, a heatsink, or other similar generally monolithic device(s) is provided to dissipate or otherwise spread heat across the components coupled to the PCB to mitigate adverse effects that can arise when the memory sub-system is exposed to temperatures that are greater than a threshold safe operating temperature range.

Although such approaches can allow for heat to be dissipated across the PCB thereby providing a cooling effect to some components of the memory sub-system, undesired effects may also occur. For example, by spreading the thermal load of the hottest components (e.g., power supplies, a power regulation areas, and/or controllers, among others) throughout the memory sub-system and therefore to components that are generally heat sensitive (e.g., memory devices), various issues can arise. For example, an increase in the temperature and/or thermal load experienced by the memory devices as a result of heat being transferred from the hottest components to the heat sensitive components can lead to the memory devices incurring increased error rates, reduced media life, and/or undesirable cross temperature behaviors.

These undesired effects can be further pronounced in some small form factor implementations (e.g., M.2 form factor architectures, etc.) where thermal management is of utmost concern due to the constrained space available to house the components of a memory sub-system. In some approaches, thermal management can be provided through the use of multiple temperature sensors, component placement, and/or complicated firmware algorithms to maintain components of the memory sub-system within a particular thermal operating range. However, adding additional components such as multiple heat sensors and processing capability to perform the complicated firmware algorithms can further exacerbate issues associated with the limited available physical space in small form factor devices. Further, memory sub-system consumers are becoming more educated in understanding that the temperature of the memory devices in a memory sub-system is generally the thermal priority and, because their data being accurately stored is of key concern, requesting that memory sub-system operating temperature values are specified in terms of the memory device operating temperatures.

These and other trends and concerns have uncovered inadequacies in approaches that utilize conventional thermal management strategies such as the employment of a heat sink to maximize the spread of heat across the memory sub-system (e.g., across the PCB of the memory sub-system). For example, in contemporary memory sub-systems, the traditional strategy of maximizing the heat spread through the use of a heat sink can induce more complex endurance issues as the memory device(s), which generally account for only a small to moderate contribution to the heat generated by the memory sub-system, are less tolerant to the increased thermal load from other components of the memory device, such as the controller(s), power regulation area(s), power supplies, etc.

Aspects of the present disclosure address the above and other deficiencies by providing a special purpose heat sink (e.g., a thermal islanding heatsink that includes a monolithic heat sink and a thermal barrier) that isolates heat transfer from the hot components (e.g., the controller(s), power regulation area(s), power supplies, etc.) to the memory devices with a thermally insulative material that is placed in between different "heat zones" of the memory sub-system. The special purpose heat sink(s) (e.g., the thermal islanding heatsink) described herein can allow for heat transfer between the hot components and the cooler components (e.g., the memory devices) to be reduced in comparison to the approaches described above, thereby improving error rates, increasing media life, increasing an amount of time between performance of thermal throttling operations, reducing a frequency of media scan operations, and/or mitigating undesirable cross temperature behaviors of the memory sub-system that can arise due to thermal behaviors of the memory sub-system. Further, as described in more detail herein, the special purpose heat sink of the present disclosure can provide thermal mitigation to components that are deployed along a bottom portion of the PCB of a memory sub-system, which is generally not possible using the monolithic heat sink paradigms of the approaches describe above.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing device 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 can be resident on a mobile computing device such as a smartphone, laptop, phablet, Internet-of-Things device, autonomous vehicle, or the like (e.g., the computing system 100 can be a mobile computing device). As used herein, the term "resident on" refers to something that is physically located on a particular component. For example, the memory sub-system 110 being "resident on" the mobile computing device refers to a condition in which the hardware that comprises the memory sub-system 110 is physically located on the mobile computing device. The term "resident on" may be used interchangeably with other terms such as "deployed on" or "located on," herein. Further, as used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

FIG. 2A illustrates an orthogonal top view of an example memory sub-system 210 in accordance with some embodiments of the present disclosure. The view of the memory sub-system 210 shown in FIG. 2A illustrates embodiments in which the components of the memory sub-system 210 are oriented on a printed circuit board (PCB) 208 such that a longest lateral dimension of the PCB 208 extends along the x-axis of FIG. 2A, and shortest lateral dimension of the PCB 208 along they-axis. The z-axis shown in FIG. 2A extends into and out of the illustration. Although embodiments are not so limited, the example memory sub-system 210 illustrated in FIG. 2 and FIG. 2B can be a memory sub-system that has a M.2 form factor.

The example memory sub-system 210 can be referred to in the alternative as a "system" or an "apparatus," herein. As used herein, an "apparatus" or "system" can refer to, but is not limited to, any of a variety of structures or combinations of structures, such as a circuit or circuitry, a die or dice, a module or modules, a device or devices, or a system or systems, for example. For example, the memory sub-system 210 can include a one or more memory modules (e.g., single in-line memory modules, dual in-line memory modules, etc.). In a number of embodiments, the memory sub-system 210 can include a multi-chip device. A multi-chip device can include a number of different memory types and/or memory modules (e.g., the memory device(s) 230 and/or the memory device(s) 240). Accordingly, the memory sub-system 210 can include non-volatile or volatile memory on any type of a module. In addition, each of the components (e.g., the controller 215, the power regulation area "PWR. REG." 214, the memory device(s) 230-1/230-2, and/or the memory device(s) 240-1) can be separately referred to herein as an "apparatus" or a "system" given the context of the disclosure.

As shown in FIG. 2A, the top portion of the memory sub-system 210 includes a controller 215, a power regulation area "PWR. REG." 214, one or more memory devices 230-1/230-2, and one or more memory device(s) 240-1. The components of the memory sub-system 210 (e.g., the controller 215, the power regulation area 214, the memory device(s) 230-1/230-2, and/or the memory device(s) 240-1)

can be resident on a PCB 208. The memory sub-system 210 can be analogous to the memory sub-system 110 illustrated in FIG. 1. Similarly, the controller 215, the memory device(s) 230-1/230-2, and/or the memory device(s) 240-1 can be analogous to the memory sub-system controller 115, the memory device(s) 130, and/or the memory device(s) 140 illustrated in FIG. 1, herein. The memory device 240-1 can be a volatile memory device and the memory devices 240-1 and 240-2 can be non-volatile memory devices.

In some embodiments, the controller 215, the power regulation area 214, the memory devices 230-1 and 230-2 and the memory device 240-1 may have access to (e.g., may be coupled to) a heat sink, such as the monolithic heat sink 318 illustrated in FIG. 3, herein.

As mentioned above, certain components of the memory sub-system 210 (e.g., the controller 215 and the power regulation area 214) generally generate more heat during operation than the memory devices 230-1 to 230-N and/or the memory devices 240-1 to 240-M. However, as described in more detail in connection with FIG. 3, below, conventional thermal dissipation techniques, such as the inclusion of a heat sink (e.g., the heat sink 318 illustrated in FIG. 3) tend to spread the heat from the components that generate more heat to the components that generate less heat during operation of the memory sub-system. This can be especially problematic because the components that generate less heat during operation of the memory device (e.g., the memory devices 230-1 to 230-N and the memory devices 240-1 to 240-M) can be more susceptible to negative effects as a result of being subjected to heat.

FIG. 2B illustrates an orthogonal bottom view of an example memory sub-system 210 in accordance with some embodiments of the present disclosure. The memory sub-system 210 illustrated in FIG. 2B is analogous to the memory sub-system 210 illustrated in FIG. 2A. Accordingly, the view of the memory sub-system 210 shown in FIG. 2B illustrates embodiments in which the components of the memory sub-system 210 are oriented on a printed circuit board (PCB) 208 such that a longest lateral dimension of the PCB 208 extends along the x-axis of FIG. 2B, and shortest lateral dimension of the PCB 208 along the y-axis. The z-axis shown in FIG. 2B extends into and out of the illustration.

In contrast to the top view illustrated in FIG. 2A, above, the memory devices 230-3 and 230-N and the memory device 240-M that are on the bottom portion of the memory sub-system 210 may not have access to (e.g., may not be coupled to) a heat sink, such as the monolithic heat sink 318 illustrated in FIG. 3, herein. Further, due to being located on a bottom portion of the PCB 308, the memory devices 230-3 and 230-N and the memory device 240-M may experience less airflow than the components that are on the top portion of the memory sub-system 210. These deficiencies can lead to a temperature differential of at least 10° Celsius between a coolest memory device (e.g., the memory device 230-1 or 230-2 illustrated in FIG. 2A) to the hottest memory device (e.g., the memory device 230-3 or 230-N), which can negatively impact performance and/or the lifetime of the memory devices 230-3 and 230-N.

As discussed above, the controller 215 and the power regulation area 214 of FIG. 2A generally generate more heat during operation than the memory devices 230-1 to 230-N and the memory devices 240-1 to 240-M. However, because the memory devices 230-3 and 230-N and the memory device 240-M may not have access to a heat sink and/or may experience reduced airflow, coupled with the tendency of the heat sink to spread heat laterally along the x-axis toward the memory devices 230-1 to 230-N and the memory devices 240-1 to 240-M, the memory devices 230-3 and 230-N and the memory device 240-M may be subjected to even more severe thermal effects than the memory devices 230-1 and 230-2 and the memory device 240-1 illustrated in FIG. 2A.

FIG. 3 illustrates an orthogonal side view of an example memory sub-system 310 in accordance with some embodiments of the present disclosure. The memory sub-system 310 illustrated in FIG. 3 is analogous to the memory sub-system 210 illustrated in FIG. 2A and FIG. 2B. The view of the memory sub-system 310 shown in FIG. 3 illustrates embodiments in which the components of the memory sub-system 310 are oriented such that a longest lateral dimension of the PCB 308 (e.g., the PCB 208 shown in FIG. 2A and FIG. 2B extends along the x-axis of FIG. 3, and a shortest lateral dimension of the PCB 208 shown in FIG. 2A and FIG. 2B extend along the y-axis, which extends into and out of the illustration). The z-axis of FIG. 3 corresponds to the z-axis shown in FIG. 2A and FIG. 2B and extends upward toward the top of the illustration to illustrate a side view of the memory sub-system 310.

The memory sub-system 310 includes a controller 315, a power regulation area 314, a memory device 340-M, and memory devices 330-1 to 330-N. It is noted that a memory device that is analogous to the memory device 240-1 illustrated in FIG. 2A is generally provided behind the power regulation area 314 (e.g., along the y-axis into the page); however, this memory device is not illustrated in FIG. 3 so as to not obfuscate the drawing layout. The controller 315, the power regulation area 314, the memory device 340-M, and the memory devices 330-1 to 330-N can be analogous to the controller 215, the power regulation area 214, the memory device 240-M, and the memory devices 230-1 to 230-N illustrated in FIG. 2A and FIG. 2B, herein. Accordingly, the memory devices 330-1 to 330-N can be non-volatile memory devices and the memory device 340-M can be a volatile memory device in some embodiments. As described herein, the controller 315 can be a memory controller such as a SSD controller, among other types of controllers and/or processing devices.

As shown in FIG. 3, the memory sub-system 310 includes a heat sink 318 (which may be referred to in the alternative as a "heatsink"). The heat sink 318 can be a monolithic heat sink that is coupled to the PCB 308, the controller 315, the power regulation area 314, the memory device 330-1, and/or the memory device 330-2. In general, the heat sink 318 is a passive heat exchanger that transfers the heat generated by the memory sub-system 310 and/or the constituent components thereof, such as the controller 315, the power regulation area 314, the memory device 340-M, and the memory devices 330-1 to 330-N, to dissipate heat within the memory sub-system 310, thereby allowing for the temperature of the memory sub-system 310 to be regulated.

As described above in connection with conventional approaches, the heat sink 318 can be coupled to a top portion (e.g., to the top portion of the memory sub-system 210 illustrated in FIG. 2A and extending upward and out of the page along the z-axis shown in FIG. 2A). Accordingly, the heat sink 318 illustrated in FIG. 3 is coupled to a top portion of the PCB 308 that includes the controller 315, the power regulation area 314, the memory devices 330-1 and 330-2, and, although not shown so as to not obfuscate the layout of the illustration, to a memory device that is analogous to the memory device 240-1 illustrated in FIG. 2A. As a result, the heat sink 318 shown in FIG. 3 is generally not physically in contact with the memory devices 330-3 to 330-N and/or the memory device 340-M.

The heat sink 318 can serve to dissipate or otherwise spread heat across the memory sub-system 310. Generally, the heat sink 318 dissipates or otherwise spreads heat laterally (e.g., along the x-axis and/or the y-axis of FIG. 3). This can serve to cause heat from the components, such as the controller 315 and the power regulation area 314 that generate more heat than the memory devices 330-1 to 330-N and the memory device 340-M, to be directed to the memory devices 330-1 to 330-N and the memory device 340-M thereby causing the memory devices 330-1 to 330-N and the memory device to 340-M to experience a greater thermal impact than may be desired.

Further, as mentioned above, the memory devices 330-3 and 330-N, as well as the memory device 340-M, may not be in contact with the heat sink 318 and/or may experience reduced airflow due their placement on the bottom portion of the PCB 308, further exacerbating the thermal impact experienced by the memory devices 330-3 and 330-N and the memory device 340-M.

Figure 4A:
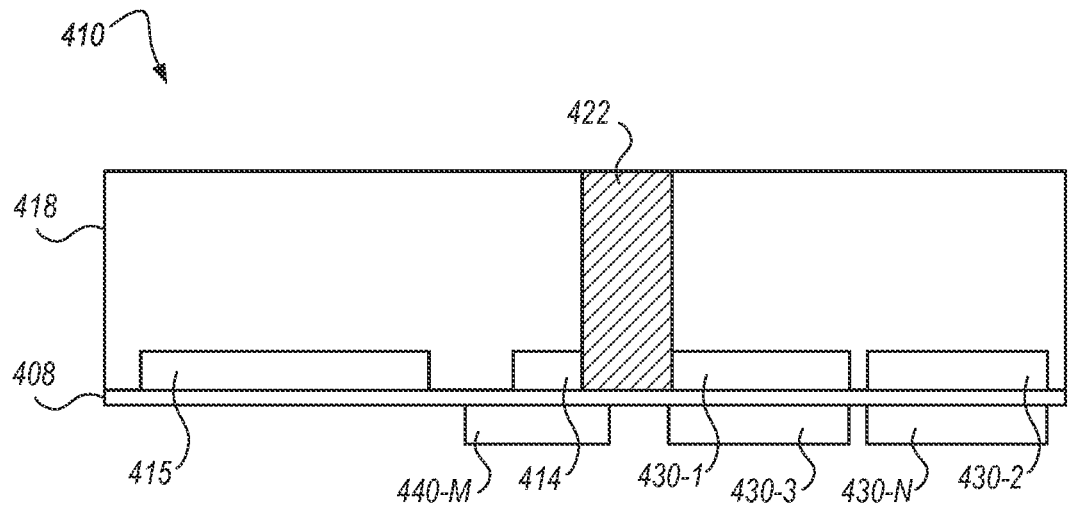
FIG. 4A illustrates an orthogonal side view of an example memory sub-system in accordance with some embodiments of the present disclosure.

FIG. 4A illustrates an orthogonal side view of an example memory sub-system 410 in accordance with some embodiments of the present disclosure. The x-axis, y-axis, and z-axis conventions described in connection with FIG. 2A, FIG. 2B, and FIG. 3, above are maintained in the discussion of FIG. 4A, FIG. 4B, FIG. 5A, and FIG. 5B that follow. Accordingly, the view of the memory sub-system 410 shown in FIG. 4A illustrates embodiments in which the components of the memory sub-system 410 are oriented such that a longest lateral dimension of the PCB 508 shown in FIG. 5A and FIG. 5B extends along the x-axis of FIG. 4A, and a shortest lateral dimension of the PCB 508 shown in FIG. 5A and FIG. 5B extend along the y-axis, which extends into and out of the illustration. The z-axis of FIG. 4A corresponds to the z-axis shown in FIG. 5A and FIG. 5B and extends upward toward the top of the illustration to illustrate a side view of the memory sub-system 410. The memory sub-system 410 illustrated in FIG. 4A can be analogous to the memory sub-system 110 illustrated in FIG. 1.

Figure 4B:
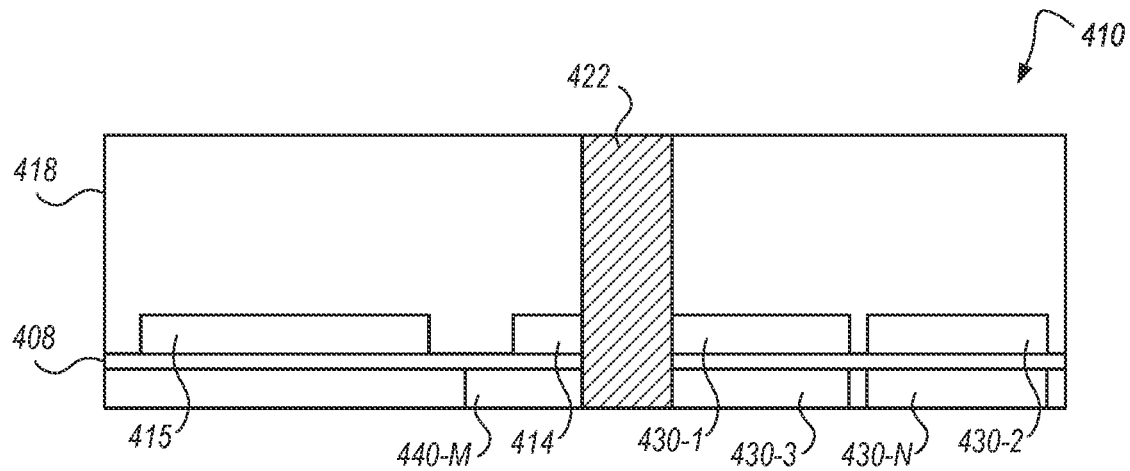
FIG. 4B illustrates an orthogonal side view of an example memory sub-system in accordance with some embodiments of the present disclosure.

The example memory sub-system 410 of FIG. 4A and FIG. 4B can be referred to in the alternative as a "system" or an "apparatus," herein. As used herein, an "apparatus" or "system" can refer to, but is not limited to, any of a variety of structures or combinations of structures, such as a circuit or circuitry, a die or dice, a module or modules, a device or devices, or a system or systems, for example. For example, the memory sub-system 410 can include a one or more memory modules (e.g., single in-line memory modules, dual in-line memory modules, etc.). In a number of embodiments, the memory sub-system 410 can include a multi-chip device. A multi-chip device can include a number of different memory types and/or memory modules (e.g., the memory device(s) 430 and/or the memory device(s) 440). Accordingly, the memory sub-system 410 can include non-volatile (e.g., the memory devices 430) and/or volatile memory (e.g., the memory devices 430) on any type of a module. In addition, each of the components (e.g., the controller 415, the power regulation area 414, the memory device(s) 430-1, 430-2, 430-3, to 430-N and/or the memory device(s) 440-M) can be separately referred to herein as an "apparatus" or a "system" given the context of the disclosure.

In contrast to the memory sub-systems 210 illustrated in FIG. 2A and FIG. 2B, and the memory sub-system 310 illustrated in FIG. 3, herein, the memory sub-system 410 illustrated in FIG. 4A includes a thermal barrier 422, which may be referred to herein in the alternative as a "thermal insulating barrier." As shown in FIG. 4A, the thermal barrier 422 is physically located such that the controller 415 and the power regulation area 414 are deployed in an area that is demarcated by the thermal barrier 422 from an area in which the memory devices (e.g., the memory devices 430-1 to 430-N and/or at least one memory device such as the memory device 440-M illustrated in FIG. 2A) are deployed. It is noted, however, that embodiments are contemplated in which the thermal barrier 422 is physically located such that the controller 415, the power regulation area 414, and a volatile memory device, such as the memory device 440-M (and/or the memory device 240-1 of FIG. 2A) are deployed in an area that is demarcated by the thermal barrier 422 from an area in which the memory devices (e.g., the memory devices 430-1 to 430-N) are deployed. Similar to FIG. 3, it is noted that a memory device that is analogous to the memory device 240-1 illustrated in FIG. 2A and/or the memory device 540-1 illustrated in FIG. 5A is generally provided behind the power regulation area 414 (e.g., along they-axis into the page); however, this memory device is not illustrated in FIG. 4A and FIG. 4B so as to not obfuscate the drawing layout.

The thermal barrier 422 shown in FIG. 4A may extend along the z-axis shown in FIG. 4A through a traditional (e.g., monolithic) heat sink 418. The traditional heat sink 418 can be analogous to the monolithic heat sink 318 described in connection with FIG. 3. As shown in FIG. 4A, the thermal barrier 422 is coupled to the top side of the PCB 408 (which can be analogous to the PCB 208 illustrated in FIG. 2A and FIG. 2B, and/or the PCB 308 illustrated n FIG. 3, herein).

The thermal barrier 422 can provide a physical barrier between the components that generate more heat during operation of the memory sub-system 410 (e.g., the controller 415 and the power regulation area 414) and the components that generate less heat during operation of the memory sub-system 410 (e.g., the memory devices 430-1 to 430-N). In some embodiments, as described in connection with FIG. 5A and FIG. 5B, herein, the thermal barrier 422 can further provide a physical barrier between the controller 415 and the power regulation area 414 and the memory device 440-M (and/or the memory device 540-1 illustrated in FIG. 5A.

The thermal barrier 422 can be formed from a thermally insulative material (e.g., materials having a relatively low thermal conductivity, such as an acrylic material). Embodiments are not so limited, however, and in some embodiments, the thermal barrier 422 can be an air gap (e.g., a region that contains air).

The size (e.g., the height, width, etc.) of the thermal barrier 422 can be configured for different applications and/or expected thermal behaviors of the memory sub-system 410. For example, the size (e.g., one or more dimensions) of the thermal barrier 422 can be larger for a memory sub-system 410 that experiences higher thermal characteristics than for a memory sub-system 410 that experiences lower thermal characteristics. Stated differently, the thermal barrier 422 can be larger for memory sub-system architectures that generate a greater amount of heat and/or to offer more protection the memory devices 430-1 to 430-N and/or the memory device 440-M than for memory sub-system architectures that generate a lesser amount of heat and/or require less protection the memory devices 430-1 to 430-N and/or the memory device 440-M.

In a non-limiting example, an apparatus (e.g., the memory sub-system 410) includes a memory device (e.g., at least one of the memory devices 430-1 to 430-N and/or at least one of the memory devices 440-1 to 440-M) and a power regulation area 414. The memory device can be a non-volatile memory device (e.g., one or more of the memory devices 440-1 to 440-N) or a volatile memory device (e.g., the memory device 440-M).

Continuing with this non-limiting example, the apparatus further includes a thermal insulating barrier (e.g., the thermal barrier 422) deployed between the memory device and the power regulation area 414. As mentioned above, the memory device and the power regulation area 414 can be resident on a solid state drive (SSD), such as the memory sub-system 410. In some embodiments, the apparatus further includes a controller 415 resident on the SSD. In such embodiments, the thermal insulating barrier can be deployed between the controller 415 and the memory device in addition to, or in the alternative of the thermal insulating barrier being deployed between the power regulation area 414 and the memory device. As described herein, the thermal insulating barrier can include an air gap and/or a thermally insulting material, such as an acrylic material. In addition to, or in the alternative, the thermal insulating barrier can be provided as a complex shape as described in connection with FIG. 5A and FIG. 5B, below.

Accordingly, the thermal insulating barrier can be implemented to reduce heat transfer from a portion of the apparatus (e.g., a portion of the apparatus that includes the controller 415 and/or the power regulation area 414) to a portion of the apparatus that includes a non-volatile memory device and/or a volatile memory device. For example, the apparatus can include a second memory device and the memory device (e.g., a first memory device) can be a non-volatile memory device while the second memory device can be a volatile memory device. In such embodiments, the memory device and the second memory device are on a first side of the thermal insulating barrier and the power regulation area and/or the controller is/are on a second side of the thermal insulating barrier.

For example, As shown in FIG. 4A, et. alibi, the thermal insulating barrier is deployed between a hot zone of a heat sink (e.g., an area where components such as the controller 415 and/or the power regulation area 414 that generate the most heat during operation of the apparatus) associated with the apparatus and a warm zone (e.g., an area where components such as the memory devices that generate the least heat during operation of the apparatus) associated with the apparatus, as described above. As used herein, the term "hot zone" generally refers to an area of the memory sub-system 410 that includes components that generate the most heat in the memory sub-system 410 while a "warm zone" generally refers to an area of the memory sub-system 410 that includes components that generate less heat than the components in the "hot zone." Stated alternatively, a "hot zone" generally refers to an area in which the controller 415 and/or the power regulation area 414 reside, while a "warm zone" generally refers to an area in which at least one non-volatile memory device resides.

As shown in FIG. 4A and FIG. 4B, the thermal insulating barrier can extend through a heat sink 418 associated with the apparatus. For example, at least a portion of the thermal insulating barrier can extend through a heat sink 418 associated with the apparatus. Further, the heat sink 418 can be one or more heat sinks (e.g., a plurality of heat sinks) and the thermal insulating barrier can be disposed between at least two of the plurality of heat sinks.

FIG. 4B illustrates an orthogonal side view of an example memory sub-system in accordance with some embodiments of the present disclosure. As mentioned above, the x-axis, y-axis, and z-axis conventions described in connection with FIG. 2A, FIG. 2B, and FIG. 3, above are maintained in the discussion of FIG. 4A, FIG. 4B, FIG. 5A, and FIG. 5B. Accordingly, the view of the memory sub-system 410 shown in FIG. 4B illustrates embodiments in which the components of the memory sub-system 410 are oriented such that a longest lateral dimension of the PCB 508 shown in FIG. 5A and FIG. 5B extends along the x-axis of FIG. 4B, and a shortest lateral dimension of the PCB 508 shown in FIG. 5A and FIG. 5B extend along the y-axis, which extends into and out of the illustration. The z-axis of FIG. 4B corresponds to the z-axis shown in FIG. 5A and FIG. 5B and extends upward toward the top of the illustration to illustrate a side view of the memory sub-system 410. The memory sub-system 410 illustrated in FIG. 4B can be analogous to the memory sub-system 410 illustrated in FIG. 4A and/or the memory sub-system 110 illustrated in FIG. 1.

The thermal barrier 422 can be analogous to the thermal barrier 422 illustrated in FIG. 4A. However, in the embodiment illustrated in FIG. 4B, the thermal barrier 422 and the heat sink 418 extend below the PCB 408 to physically demarcate the area that includes the controller 415 and the power regulation area 414 and the area in which the memory devices (e.g., the memory devices 430-1 to 430-N and/or at least one memory device such as the memory device 430-M and/or a memory device such as the memory device 530-1 of FIG. 5A are deployed). It is noted, however, that embodiments are contemplated in which the thermal barrier 422 is physically located such that the controller 415, the power regulation area 414, and a volatile memory device, such as the memory device 440-M (and/or the memory device 240-1 of FIG. 2A) are deployed in an area that is demarcated by the thermal barrier 422 from an area in which the memory devices (e.g., the memory devices 430-1 to 430-N) are deployed. This can allow additional thermal mitigation to be provided to the memory devices 430-3 and 430-N, as well as the memory device 440-M that are located on the bottom portion of the PCB 408.

For example, by extending the thermal barrier 422 (and/or the heat sink 418) below the PCB 408, the memory devices 430-3 and 430-N, as well as the memory device 440-M can be further isolated from the controller 415 and the power regulation area 414 than the embodiments shown in FIG. 4A. This can allow for improved thermal mitigation to the memory devices 430-3 and 430-N, as well as the memory device 440-M, which can lead to improved memory device performance and/or extended memory device lifetime in comparison to other approaches, as discussed above.

FIG. 5A illustrates an orthogonal top view of an example memory sub-system 510 in accordance with some embodiments of the present disclosure. As shown in FIG. 5A, the memory sub-system 510 includes a heat sink 518, a controller 515, a power regulation area "PWR. REG." 514, one or more memory devices 530-1/530-2, and one or more memory device(s) 540-1. The components of the memory sub-system 510 (e.g., the controller 515, the power regulation area 514, the memory device(s) 530-1/530-2, and/or the memory device(s) 540-1) can be resident on a PCB 508. The memory sub-system 510 can be analogous to the memory sub-system 410 illustrators in FIG. 4A and FIG. 4B and/or the memory sub-system 110 illustrated in FIG. 1. Similarly, the heat sink 518 controller 515, the memory device(s) 530-1/530-2, and/or the memory device(s) 540-1 can be analogous to the memory sub-system controller 115, the memory device(s) 130, and/or the memory device(s) 140 illustrated in FIG. 1, and/or to the controller 215/315/415, the memory device(s) 230/330/430, and/or the memory device(s) 240/340/440 illustrated in FIGS. 2A, 2B, 3, 4A, and/or 4B, herein. Further, the heat sink 518 can be analogous to the heat sink 418 illustrated in FIGS. 4A and 4B, herein.

As shown in FIG. 5A, the memory sub-system 510 includes a thermal barrier 522, which can be analogous to the thermal barrier 422 illustrated in connection with FIG. 4A and FIG. 4B, herein. In the embodiments illustrated in FIG. 5A and FIG. 5B, the thermal barrier 522 is provided in a complex shape such that the memory devices 540-1 and/or 540-M are isolated from the controller 515 and the power regulation area 514. As used herein, the term "complex shape," particularly in relation to the thermal barrier, generally refers to a shape that is not consistently parallel and perpendicular with respect to the x-axis and they-axis (e.g., a shape that is not rectangular with respect to the x-axis and they-axis). By utilizing the complex shape for the thermal barrier 522 as shown in FIG. 5A and FIG. 5B, it can be possible to pick which components of the memory sub-system 510 are located on an opposite side of the thermal islanding heatsink 522 and which components are located on a same side of the thermal islanding heatsink 522.

In a non-limiting example, an apparatus (e.g., the memory sub-system 510) includes a printed circuit board (PCB) 508, a controller 515 coupled to the PCB 508, and a power regulation area "PWR. REG." 514 coupled to the PCB 508. The apparatus can further include a non-volatile memory device (e.g., the memory devices 530-1 to 530-N) coupled to the PCB 508 and a volatile memory device (e.g., the volatile memory devices 540-1 to 540-M) coupled to the PCB). The apparatus further includes a thermal insulating barrier (e.g., the thermal barrier 522) coupled to the PCB 508. As describe above, the thermal insulating barrier can comprise an air gap and/or a thermally insulting material and/or the thermal insulating barrier can be formed in a complex shape.

Continuing with this non-limiting example, the thermal insulating barrier is deployed between the controller 515 and the power regulation area 514 and at least one of the non-volatile memory device and the volatile memory device. That is, the thermal insulating barrier is physically located between the controller 515 and the power regulation area 514 and at least one of the non-volatile memory device and the volatile memory device.

The apparatus can further include a heat sink (e.g., the monolithic heat sink 418 illustrated in FIG. 4A and FIG. 4B, herein). The monolithic heat sink can be coupled to the PCB 508 and the thermal insulating barrier can be formed through at least a portion of the monolithic heat sink as shown in FIG. 4A and FIG. 4B. In some embodiments, such as the embodiments shown in FIG. 4B, the monolithic heat sink can encompass the PCB 508 (e.g., can warp around all or most sides of the PCB 508) and the thermal insulating barrier can be formed entirely through the monolithic heat sink and/or the PCB 508 such that the thermal insulating barrier extends below a bottom portion of the PCB 508.

As described above, the controller 515 and the power regulation area 514 are disposed on a top portion of the PCB 508 and at least one of the non-volatile memory device and the volatile memory device are disposed on a bottom portion of the PCB 508. In such embodiments, at least a "warm zone" of the heat sink (and/or the thermal insulating barrier) is in physical contact with at least the one of the non-volatile memory device and the volatile memory device that is disposed on the bottom portion of the PCB 508. Embodiments are not so limited, however, and in some embodiments, the controller 515, the power regulation area 514, and at least one of the non-volatile memory device and the volatile memory device are disposed on a top portion of the PCB. In such embodiments, at least the "warm zone" of the heat sink (and/or the thermal insulating barrier) is in physical contact with at least the one of the non-volatile memory device and the volatile memory device that is disposed on the top portion of the PCB 508.

FIG. 5B illustrates an orthogonal bottom view of an example memory sub-system in accordance with some embodiments of the present disclosure. The memory sub-system 510 illustrated in FIG. 5B is analogous to the memory sub-system 510 illustrated in FIG. 5A. Accordingly, the view of the memory sub-system 510 shown in FIG. 5B illustrates embodiments in which the components of the memory sub-system 510 are oriented on a PCB 508 such that a longest lateral dimension of the PCB 508 extends along the x-axis of FIG. 5B, and shortest lateral dimension of the PCB 508 along they-axis. The z-axis shown in FIG. 5B extends into and out of the illustration, as described above.

As shown in FIG. 5B, the memory sub-system 510 includes a thermal barrier 522, which can be analogous to the thermal barrier 422 and/or the thermal barrier 522 illustrated in connection with FIG. 4A, FIG. 4B, and FIG. 5A, herein. The thermal barrier 522 illustrated in FIG. 5B extends below the PCB 508 similar to the embodiment shown in FIG. 4B. That is, in the illustration of FIG. 5B, the thermal barrier 522 extends below the PCB 508 to physically demarcate the area that includes the controller 515 and the power regulation area 514 of FIG. 5A and the area in which the memory devices (e.g., the memory devices 530-3 and 530-N and/or the memory device 530-M is deployed. This can allow additional thermal mitigation to be provided to the memory devices 530-3 and 530-N, as well as the memory device 540-M that are located on the bottom portion of the PCB 508.

As described above, by extending the thermal barrier 522 below the PCB 508, the memory devices 530-3 and 530-N, as well as the memory device 540-M can be further isolated from the controller 515 and the power regulation area 514 than the embodiments shown in FIG. 4A. This can allow for improved thermal mitigation to the memory devices 530-3 and 530-N, as well as the memory device 540-M, which can lead to improved memory device performance and/or extended memory device lifetime in comparison to previous approaches described herein.

In a non-limiting example, an apparatus can include a memory sub-system 510 that includes a printed circuit board (PCB) 508, a controller 515, a power regulation area "PWR. REG." 514, at least one non-volatile memory device (e.g., at least one of the memory devices 530-1 to 530-N), at least one volatile memory device (e.g., at least one of the memory devices 540-1 to 540-M), a heat sink (e.g., the heat sink 318 illustrated in FIG. 3 and/or the heat sink 418 illustrated in FIG. 4A and FIG. 4B) and a thermal barrier 522 (e.g., the thermal barrier 422 illustrated in FIG. 4A and FIG. 4B).

The thermal insulating barrier can be deployed between the controller 515 and the power regulation area 514 and at least one non-volatile memory device and/or at least one volatile memory device, as described above. In some embodiments, although not explicitly shown in FIG. 5A or 5B, the volatile memory device may generate less heat and/or may be less susceptible to adverse effects of heat than the non-volatile memory device(s) and may therefore be on a same side of the thermal insulating barrier as the controller 515 and the power regulation area 514. As described above, the thermal insulating barrier can be formed in a complex shape, such as a non-rectangular shape. Further, in some embodiments, the thermal insulating barrier can include an air gap or a thermally insulting material, or both.

In this non-limiting example, the thermal insulating barrier is formed entirely through the monolithic heat sink such that the thermal insulating barrier extends beyond an area defined by the monolithic heat sink. Stated alternatively, the thermal insulating barrier can be formed such that the thermal insulating barrier extends through the monolithic heat sink and the PCB 508 to provide thermal mitigation to components of the memory sub-system 510 that are disposed on a top portion of the PCB 508 and a bottom portion of the PCB 508, as described above. Embodiments are not so limited, however, and the thermal insulating barrier can be formed such that the thermal insulating barrier extends above the monolithic heat sink (e.g., in a larger lateral dimension with respect to the z-axis shown in at least FIG. 4A and FIG. 4B) or the thermal insulating barrier can be formed such that the thermal insulating barrier extends below the monolithic heat sink (e.g., in a smaller lateral dimension with respect to the z-axis shown in at least FIG. 4A and FIG. 4B).

As discussed herein, the controller 515 and the power regulation area 514 can be disposed on a top portion of the PCB 508 and at least one of the non-volatile memory devices or at least one of the volatile memory devices are disposed on a bottom portion of the PCB 508. Continuing with this non-limiting example, the controller 515, the power regulation area 514, at least one of the non-volatile memory device or at least one of the volatile memory device are disposed on a top portion of the PCB 508 and at least one of the non-volatile memory device or at least one of the volatile memory device are disposed on a bottom portion of the PCB 508. In such embodiments, the "warm zone" of the heat sink and/or at least a portion of the thermal insulating barrier can be in physical contact with at least one of the non-volatile memory device and at least one of the volatile memory device that is disposed on the top portion of the PCB 508 and/or the "warm zone" of the heat sink and/or at least a portion of the thermal insulating barrier can be in physical contact with at least one of the non-volatile memory device and the volatile memory device that is disposed on the bottom portion of the PCB 508.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a printed circuit board (PCB);
   a memory device coupled to the PCB;
   a power regulation area;
   a thermal insulating barrier deployed between the memory device and the power regulation area; and
   a monolithic heat sink coupled to the PCB, wherein the thermal insulating barrier is formed through at least a portion of the monolithic heat sink.

2. The apparatus of claim 1, wherein the memory device and the power regulation area are resident on a solid state drive (SSD).

3. The apparatus of claim 2, further comprising a controller resident on the SSD, wherein the thermal insulating barrier is deployed between the controller and the memory device.

4. The apparatus of claim 1, wherein the memory device comprises a non-volatile memory device or a volatile memory device.

5. The apparatus of claim 1, wherein at least a portion of the thermal insulating barrier extends through a heat sink associated with the apparatus.

6. The apparatus of claim 1, wherein the thermal insulating barrier is deployed between a hot zone of a heat sink associated with the apparatus and a warm zone associated with the apparatus.

7. The apparatus of claim 1, wherein the memory device is a non-volatile memory device, and wherein the thermal insulating barrier is to reduce heat transfer from a portion of the apparatus to the non-volatile memory device.

8. The apparatus of claim 1, wherein the thermal insulating barrier comprises an air gap or a thermally insulting material, or both.

9. The apparatus of claim 1, further comprising a second memory device, wherein:
the memory device is a non-volatile memory device,
the second memory device is a volatile memory device,
the memory device and the second memory device are on a first side of the thermal insulating barrier, and
the power regulation area is on a second side of the thermal insulating barrier.

10. The apparatus of claim 1, wherein the thermal insulating barrier comprises a complex shape.

11. An apparatus, comprising:
a printed circuit board (PCB);
a controller coupled to the PCB;
a power regulation area coupled to the PCB;
a non-volatile memory device coupled to the PCB;
a volatile memory device coupled to the PCB; and
a thermal insulating barrier coupled to the PCB, wherein the thermal insulating barrier is deployed between the controller and the power regulation area and the non-volatile memory device and the volatile memory device, wherein the controller and the power regulation area are disposed on a top portion of the PCB and at least one of the non-volatile memory device and the volatile memory device are disposed on a bottom portion of the PCB.

12. The apparatus of claim 11, further comprising a monolithic heat sink coupled to the PCB, wherein the thermal insulating barrier is formed through at least a portion of the monolithic heat sink.

13. The apparatus of claim 11, further comprising a monolithic heat sink coupled to the PCB, wherein the thermal insulating barrier is formed through at least a portion of the monolithic heat sink, wherein a warm zone of the monolithic heat sink is in physical contact with at least the one of the non-volatile memory device and the volatile memory device that is disposed on the bottom portion of the PCB.

14. The apparatus of claim 11, wherein the controller, the power regulation area, and at least one of the non-volatile memory device and the volatile memory device are disposed on the top portion of the PCB.

15. The apparatus of claim 14, further comprising a monolithic heat sink coupled to the PCB, wherein the thermal insulating barrier is formed through at least a portion of the monolithic heat sink, wherein a warm zone of the monolithic heat sink is in physical contact with at least the one of the non-volatile memory device and the volatile memory device that is disposed on the top portion of the PCB.

16. The apparatus of claim 11, further comprising a monolithic heat sink coupled to the PCB, wherein the thermal insulating barrier is formed entirely through the monolithic heat sink such that at least a portion of the thermal insulating barrier extends around a bottom portion of the PCB, or below the bottom portion of the PCB, or both.

17. The apparatus of claim 11, wherein:
the thermal insulating barrier comprises an air gap or a thermally insulting material, or both, and the thermal insulating barrier comprises a complex shape.

18. An apparatus, comprising:
a memory sub-system, the memory sub-system comprising:
a printed circuit board (PCB);
a controller;
a power regulation area;
at least one non-volatile memory device;
at least one volatile memory device;
a heat sink; and
a thermal insulating barrier, wherein the thermal insulating barrier:
is deployed between the controller and the power regulation area and at least the at least one non-volatile memory device and the at least one volatile memory device, and
is formed through at least a portion of a monolithic heat sink.

19. The apparatus of claim 18, wherein the thermal insulating barrier is formed entirely through the monolithic heat sink such that the thermal insulating barrier extends beyond an area defined by the monolithic heat sink.

20. The apparatus of claim 18, wherein the controller and the power regulation area are disposed on a top portion of the PCB and the at least one of the non-volatile memory device or the at least one of the volatile memory device are disposed on a bottom portion of the PCB.

21. The apparatus of claim 18, wherein:
the controller and the power regulation area, and the at least one of the non-volatile memory device or the at least one of the volatile memory device are disposed on a top portion of the PCB,
the at least one of the non-volatile memory device or the at least one of the volatile memory device are disposed on a bottom portion of the PCB, and
a warm zone of the heat sink is in physical contact with the at least one of the non-volatile memory device and the at least one of the volatile memory device that is disposed on the top portion of the PCB, or the warm zone of the monolithic heat sink is in physical contact with at least the one of the at least one of the non-volatile memory device and the at least one of the volatile memory device that is disposed on the bottom portion of the PCB.

22. The apparatus of claim 18, wherein the thermal insulating barrier comprises a non-rectangular shape.

23. The apparatus of claim 18, wherein the thermal insulating barrier comprises an air gap or a thermally insulting material, or both.

* * * * *